March 31, 1970  R. E. MARTIN  3,503,577
BASE FOR SUPPORTING MACHINERY
Filed April 30, 1968  2 Sheets-Sheet 1
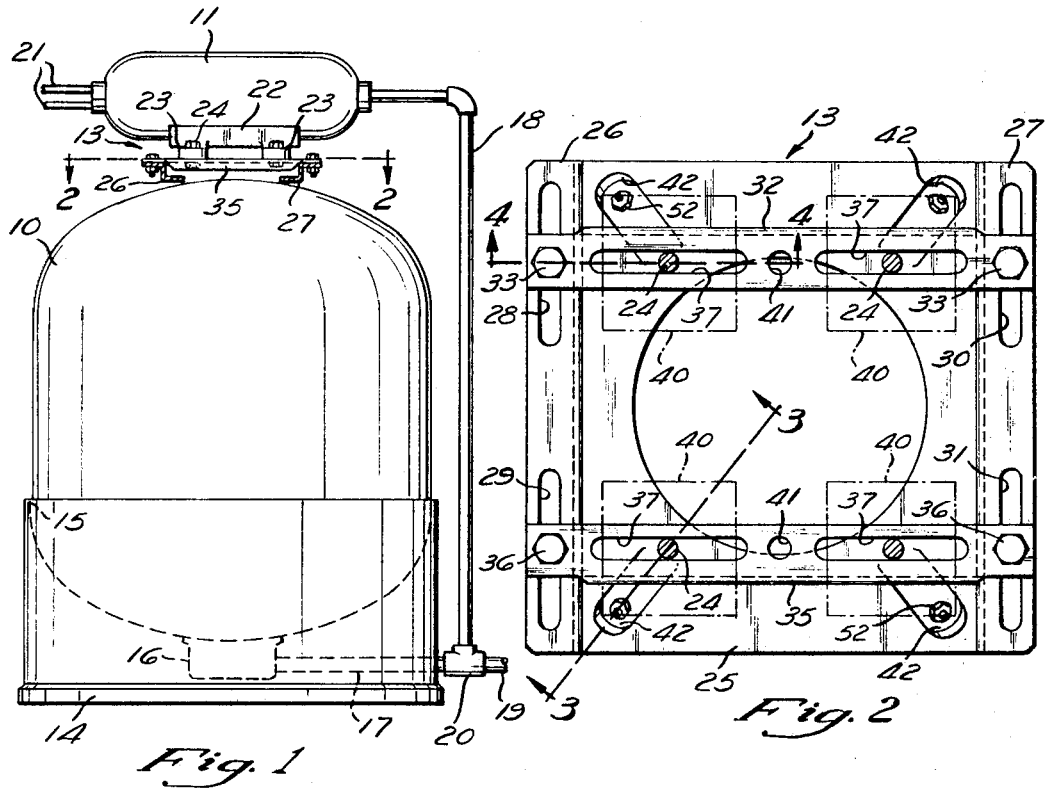
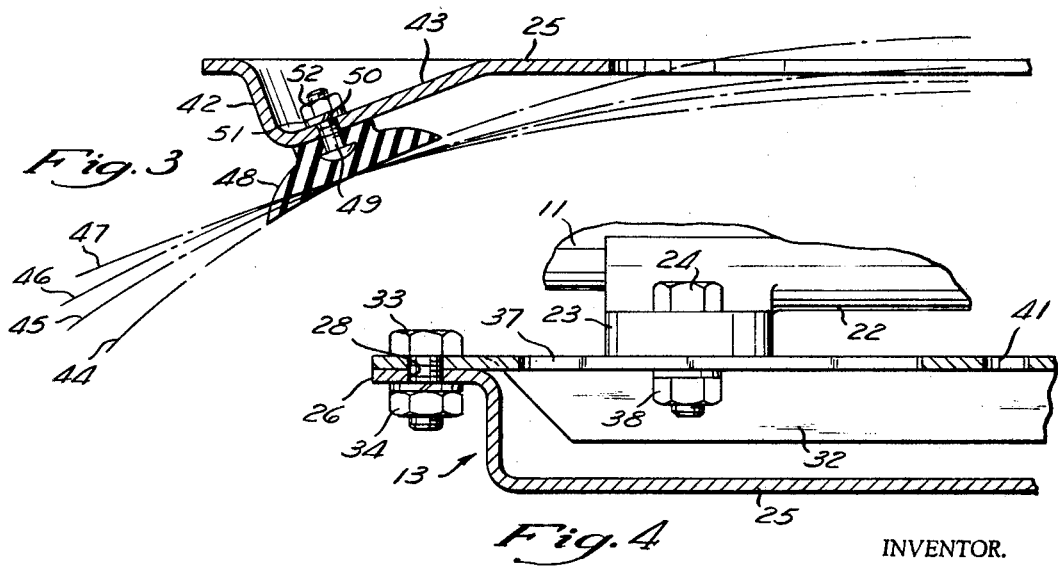
INVENTOR.
RICHARD E. MARTIN
BY
McNENNY, FARRINGTON, PEARNE & GORDON
ATTORNEYS March 31, 1970     R. E. MARTIN     3,503,577
BASE FOR SUPPORTING MACHINERY
Filed April 30, 1968     2 Sheets-Sheet 2
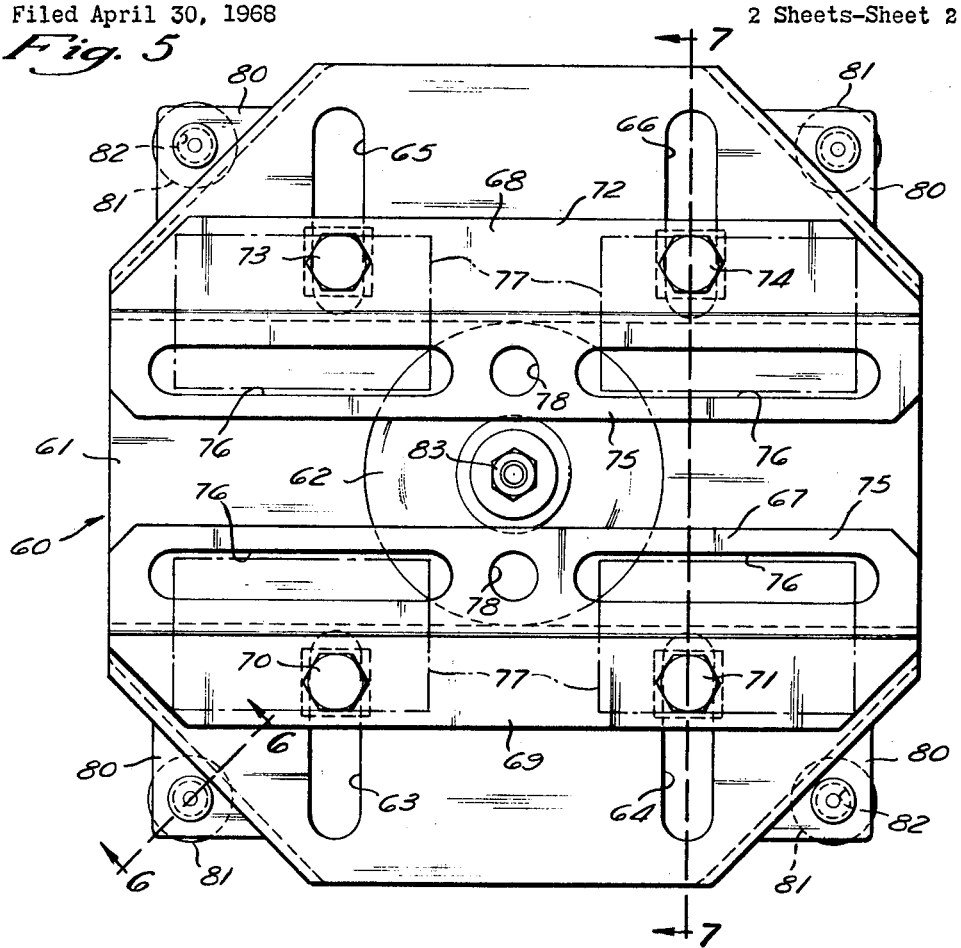
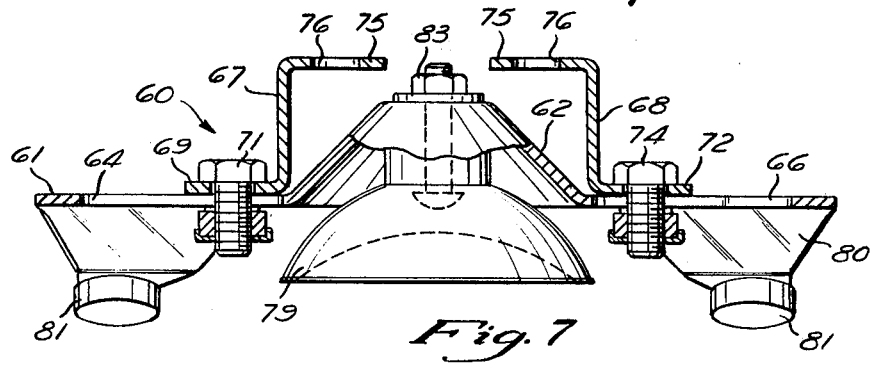
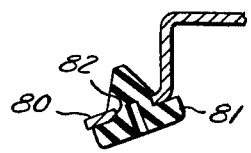
INVENTOR.
RICHARD E. MARTIN
BY
McNENNY, FARRINGTON, PEARNE & GORDON
ATTORNEYS United States Patent Office 3,503,577
Patented Mar. 31, 1970

3,503,577
BASE FOR SUPPORTING MACHINERY
Richard E. Martin, Willoughby, Ohio, assignor to Structural Fibers, Inc., Chardon, Ohio, a corporation of Ohio
Filed Apr. 30, 1968, Ser. No. 725,392
Int. Cl. F16m 1/00
U.S. Cl. 248—23                                                 7 Claims

ABSTRACT OF THE DISCLOSURE

A base adapted to be secured to a curved surface and having a plurality of slots to receive article fastening means, said slots being adjustable laterally to accommodate articles of varying dimensions.

BACKGROUND OF THE INVENTION

The invention relates to a frame assembly which is employed as a coupling member to mount an article on a base which may be adjusted to accommodate a variety of articles each of which has differently located mounting means thereon and which may be employed to mount such articles on a variety of bases, each of which has differently curved mounting surfaces.

The mounting frame according to this invention is particularly suited for mounting any one of a variety of pumps on a tank which is associated with the pump. For example, the mounting frame according to this invention is particularly suited for a home water installation wherein a pump is employed to pump well water into a pressure tank which serves as an accumulator to deliver water to house water taps under pressure.

In many such installations, it is desirable to arrange the pump and tank vertically to conserve space. In those installations, the pump is mounted on the top of the tank. In order to so mount the pump, it was believed to be necessary to drill holes in the top of the tank to accommodate the mounting bolts of the pump base. However, since the tank is pressurized in service, such a procedure requires seals between the mounting bolts and the holes in the tank. Moreover, the provision of holes in the tank results in stress concentration areas which are unsuitable for pressurized tank applications. This is particularly true if the tank is a molded glass fiber-reinforced plastic resin tank, since, in those tanks, such holes would adversely affect the structural integrity of the tank, particularly under the pressure cycling conditions to which the tank is subjected. A further disadvantage of the provision of mounting holes in the tank is that such holes would be suitable for mounting a particular pump but would not be suitable for mounting pumps having differently spaced mounting bolts thereon.

A further problem involved in directly mounting a pump on a tank is that the tank top has a convex surface and the pumps are designed to be mounted on flat surfaces. Although this problem is not particularly acute with respect to large tanks having a relatively large radius of curvature, smaller tanks have convex surfaces with a relatively small radius of curvature.

SUMMARY OF THE INVENTION

The present invention provides a mounting frame having a bottom portion or portions which may be cemented to a variety of differently curved convex or even flat surfaces, such as the top surface of a tank, without drilling holes in the surface. The upper portion of the mounting frame has slide bars which may be adjustably fixed relative to the upper portion of the frame to accommodate the mounting bolts of a wide variety of articles, such as pumps having differently located mounting bolts. The bottom portions of the frame are designed to minimize the transmission of vibrations between the pump and the tank.

BRIEF DESCRIPTION OF THE DRAWINGS

FIGURE 1 is an elevational view of a tank and pump employed in a home water system, showing a mounting frame according to one aspect of this invention mounting the pump on the tank;

FIGURE 2 is an enlarged, sectional view, the plane of the section being indicated by the line 2—2 in FIGURE 1;

FIGURE 3 is an enlarged, fragmentary, sectional view, the plane of the section being indicated by the line 3—3 in FIGURE 2;

FIGURE 4 is an enlarged, fragmentary, sectional view, the plane of the section being indicated by the line 4—4 in FIGURE 2;

FIGURE 5 is a plan view of a mounting frame according to another aspect of this invention;

FIGURE 6 is a sectional view, the plane of the section being indicated by the line 6—6 in FIGURE 5; and FIGURE 7 is a sectional view, the plane of the section being indicated by the line 7—7 in FIGURE 5.

DESCRIPTION OF ONE ASPECT OF THE INVENTION

In FIGURE 1, a home water system assembly is indicated. The system includes a pressure or accumulator tank 10 having a pump 11 mounted thereon by a mounting frame 13 according to one aspect of this invention. The tank 10 may comprise a fiber-reinforced, plastic tank produced in accordance with the teachings of Randolph Reissue Patent No. 25,241 and is vertically supported on an annular foot structure 14. The annular foot structure 14 may be integrally molded with the tank 10, or it may be a separate article of manufacture which is cemented to or snapped onto an annular shoulder 15 which is molded into the tank.

The tank 10 has a relatively small access opening in its bottom which is provided with a fitting 16. The fitting 16 communicates with an inlet-outlet conduit 17, which is connected to a pump delivery conduit 18 and a conduit 19 by a T fitting 20. The conduit 19 supplies pressurized water to the home. The pump 11 pumps water from a well (not shown) by conduits 21, and delivers the water to the tank 10 and to the conduit 19. The tank 10 has an air cushion therein near its top which serves as a pressure source to deliver water to the home under predetermined pressures.

The pump 11 has a mounting base 22 which is provided with a plurality of bolt receiving bosses 23. Each boss 23 receives a bolt 24, which serves as a mounting member for the pump 11. As may be appreciated, the particular location of the bosses 23 and the bolts 24 varies according to the size of the pump and according to the designs of the particular manufacturer of the pump. According to this invention, means are provided on the mounting frame 13 to accommodate differently located mounting bolts 24.

Referring now to FIGURES 2 and 4, the mounting frame 13 includes a base plate 25 having raised side flange portions 26 and 27. The flange portion 26 has longitudinally extending slots 28 and 29 therein and, similarly, the flange portion 27 has longitudinally extending slots 30 and 31 which are respectively parallel to the slots 28 and 29. A first slide bar 32 extends between the flanges 26 and 27, and is adjustably fixed to the flanges 26 and 27 by bolts 33 and cooperating nuts 34. The slide bar 32 may be therefore fixed in any one of a multiplicity of positions by loosening the bolts 33 and sliding the slide bar 32 along the flanges 26 and 27.

A second slide bar 35 extends between the flanges 26 and 27 and is adjustably fixed to the flanges 26 and 27 by bolts 36 and cooperating nuts (not shown). The slide bar 35 may therefore be fixed in any one of a plurality of predetermined positions by loosening the bolts 36 and sliding the slide bar 35 along the flanges 26 and 27 and, when the desired position is reached, tightening the bolts 36.

The mounting bolts 24 extend through slots 37, which are provided in the slide bars 32 and 35, and the bolts 24 are fixed relative to the slide bars 32 and 35 by nuts 38.

As may be seen in FIGURE 2, the mounting bolt receiving slots 37 may be adjusted relative to the plate 25 so that they define bolt receiving zones 40. The bolt receiving zones 40 define area within which differently located mounting bolts 24 may be fixed relative to the plate 25. It should be appreciated that these zones may be enlarged by lengthening the slots 28, 29, 30, 31, and 37, or by providing continuous slots on the flanges 26 and 27 and on the slide bars 32 and 35.

The slide bars 32 and 35 are further provided with holes 41 which may be employed to accommodate pump bases having three triangularly positioned mounting bolts therewith, or pump bases having only two mounting bolts.

The plate 25 is provided with four supporting legs 42, which are spaced about a centrally located aperture provided in the plate 25. In FIGURE 3, one of the supporting legs 42 is shown in detail. The supporting leg 42 is stamped into the mounting plate 25 so that it has a downwardly extending leg element 43. The leg element 43 is substantially tangential to the surface of the tank 10 and the particular angle with the leg element 43 defines with respect to the mounting plate 25 is determined by the surface shape of the upper portion of the tank 10. The angle shown in FIGURE 3 is suitable for convex curvatures 44, 45, 46, and 47, and those curvatures respectively correspond to 12, 20, 30, and 42-gallon capacity tanks. The illustrated leg element 43 is substantially tangential to all of these curvatures.

A surface-engaging mounting member 48 is provided on each leg 42. Each mounting member 48 may be made from elastomeric material so that it may conform to the curvatures 44–47. A bolt 49 is molded into the mounting member 48 and extends through a hole 50 in the leg element 43. A shakeproof washer 51 and a nut 52 lock the element 48 to the leg 43. The element 48 is securely bonded to the tank with, for example, epoxy cement.

The resulting structure provides a permanent frame mount on the tank and reduces any vibrations between the pump and the tank. If it is necessary to remove the frame 13 from the tank for any reason, the nuts 52 and the washers 51 may be removed from the bolts 49 or the elements 48 may be cut from the tank 10.

DESCRIPTION OF A FURTHER ASPECT OF THE INVENTION

Referring now to FIGURES 5, 6, and 7, a mounting frame 60 according to a further aspect of this invention is illustrated. The mounting frame 60 includes a base plate 61 having a centrally located dished portion 62. The base plate 61 is provided with a first pair of parallel slots 63 and 64 and with a second pair of parallel slots 65 and 66.

A first slide bar 67 extends across and over the slots 63 and 64 and a second slide bar 68 extends across and over the slots 65 and 66. The slide bar 67 has a foot portion 69 which is adjustably fixed to the base plate 61 by bolts 70 and 71, which cooperate with the slots 63 and 64 respectively. The slide bar 67 may be fixed, therefore, in any one of a multiplicity of positions by loosening the bolts 70 and 71 and sliding the slide bar 67 toward or away from the dished portion 62.

Similarly, the slide bar 68 has a foot portion 72 which is adjustably fixed to the base plate 61 by bolts 73 and 74, which cooperate with the slots 65 and 66 respectively. The slide bar 72 may be fixed, therefore, in any one of a multiplicity of positions by loosening the bolts 73 and 74 and sliding the slide bar 68 toward and away from the dished portion 62. Each slide bar 67 and 68 is provided with a raised flange portion 75 to provide clearance between the slide bars 67 and 68 and the dished portion 62 as the slide bars 67 and 68 are moved toward each other. The flange portions 75 are provided with slots 76 which receive the bolts 24 of the pump 11.

The slots 76 may be adjusted relative to the plate 61 so that they define bolt receiving zones 77. The bolt receiving zones 77 define areas within which differently located mounting bolts 24 may be fixed relative to the plate 61. It should be appreciated that these zones may be enlarged by lengthening the slots 63, 64, 65, 66, and 76, or by providing continuous slots on the plates 61 and on the slide bars 67 and 68. Furthermore, these zones may be greatly extended outwardly in the direction of the slots 63–66 by reversing the illustrated positions of the slide bars 67 and 68 so that the raised flange portion 75 of each slide bar points outwardly relative to the dished portion 62.

The slide bars 67 and 68 are further provided with holes 78 which may be employed to accommodate pump bases having three triangularly positioned mounting bolts therewith, or pump bases having only two mounting bolts.

The plate 61 is provided with a surface-engaging mounting member 79 which is received in the dished portion 62. The mounting member 79 may be formed from elastomeric material so that it may conform to the curvature of the surface to be engaged.

The plate 61 is provided with four stabilizing legs 80 and, as may be seen in greater detail in FIGURE 6, each leg 80 is provided with a bumper 81 which may be molded from a suitable elastomeric material and snapped into an aperture 82 in the leg 80.

The mounting frame 60 may be affixed to a tank, such as the tank 10, by coating the bottom surface of the mounting member 79 with a suitable cement, such as, for example, epoxy cement, and applying downward pressure on the frame 60 so that the mounting member 79 is forced into intimate engagement with the top surface of the tank 10. The mounting member 79 is affixed to the tank 10 so that its axis substantially coincides with the axis of the tank and so that the bumpers 81 engage the tank to provide lateral stability for the pump mounted on the frame.

According to this aspect of the invention, the horizontal orientation of the pump may be adjusted by loosening a nut 83 and rotating the frame 60 and the pump mounted thereon relative to the tank 10 and the mounting member 79. When a preselected orientation is achieved, the nut 83 is retightened.

The resulting structure provides a permanent frame mount on the tank and reduces any vibrations between the pump and the tank. If it is necessary to remove the frame 60 from the tank for any reason, the nut 83 may be removed so that the frame may be removed from the mounting member 79, or the mounting member 79 may be cut from the tank.

The invention is not restricted to the slavish imitation of each and every detail set forth above. Obviously, devices may be provided which change, eliminate, or add certain specific details without departing from the scope of the invention.

What is claimed is:

1. A mounting frame for mounting a variety of articles on a variety of differently curved bases, each such article having differently spaced mounting bolts, said frame comprising a base plate having at least one slidable mounting bar thereon, said base plate having a substantially planar body portion, said body portion including leg means extending at an angle relative to said planar portion and substantially tangentially to the surface of said curved bases, means for guiding said bar between spaced positions in a first direction and fixing said bar relative to said plate in any one of an infinite number of locations, slot means on said mounting bar extending in a second direction and defining an infinite number of mounting bolt receiving positions, whereby said frame may receive differently located mounting bolts within a zone defined in said first direction by said spaced positions and defined in said second direction by the extent of said slot means.

2. A mounting frame according to claim 1 wherein said leg means are provided with elastomeric surface engaging members.

3. The mounting frame according to claim 2 wherein each surface engaging member is adapted to be cemented to a surface.

4. The mounting frame according to claim 2 wherein one surface-engaging member is adapted to be cemented to a surface and the remaining surface-engaging members are adapted to stabilize the frame.

5. The mounting frame according to claim 4 wherein said one surface-engaging member is centrally located on the bottom surface of the frame.

6. A mounting frame according to claim 1 wherein said mounting bar has a foot portion and a raised flange portion which are substantially parallel to each other and which extend in opposite directions from a connecting web portion, said foot portion being adapted to be fixed to said plate in said any one of said infinite number of locations and also being adapted to be fixed to said plate so that said raised flange portion extends either toward or away from the center of said plate.

7. A mounting frame for mounting a variety of articles on a variety of differently curved bases, each such article having differently spaced mounting bolts, said frame comprising a base plate having raised flange surfaces at opposite edges thereof, said base plate having an aperture therethrough to receive a portion of said curved bases, first and second slidable mounting bars extending between said flange surfaces, means for guiding each of said bars between spaced positions in a first direction and fixing said bars relative to said plate in any one of an infinite number of locations, slot means on each of said mounting bars extending in a second direction and defining an infinite number of mounting bolt receiving positions, whereby said frame may receive differently located mounting bolts within zones defined in said first direction by said spaced positions and defined in said second direction by the extent of said slot means.

References Cited

UNITED STATES PATENTS

| 1,831,165 | 11/1931 | Eastman | 248—23 |
| 3,295,810 | 1/1967 | Kintish | 248—206 |
| 3,322,386 | 5/1967 | Kunkle | 248—206 |

FOREIGN PATENTS

| 817,665 | 9/1937 | France. |
| 432,103 | 7/1926 | Germany. |
| 313,049 | 7/1930 | Great Britain. |
| 85,354 | 2/1955 | Norway. |

ROY D. FRAZIER, Primary Examiner

J. F. FOSS, Assistant Examiner

U.S. Cl. X.R.

248—346